Oct. 21, 1969     F. I. MOYER     3,473,549
SAFETY CONTROL APPARATUS
Filed May 16, 1967     2 Sheets-Sheet 1
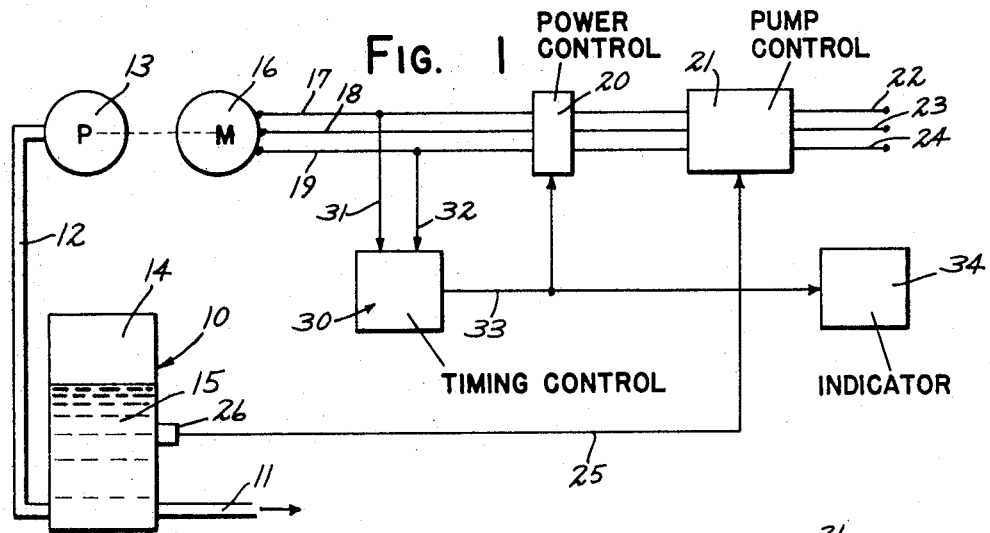
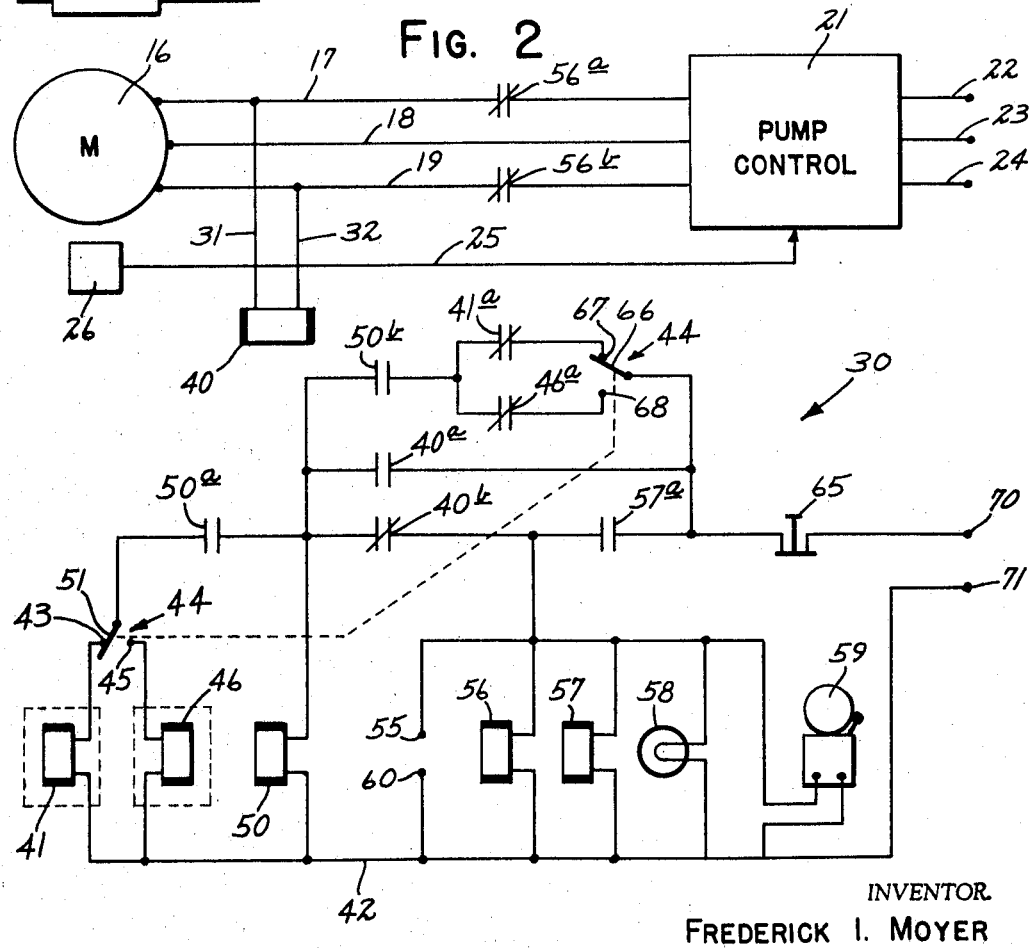
INVENTOR.
FREDERICK I. MOYER
BY
Merchant & Gould
ATTORNEYS Oct. 21, 1969  F. I. MOYER  3,473,549
SAFETY CONTROL APPARATUS
Filed May 16, 1967  2 Sheets-Sheet 2
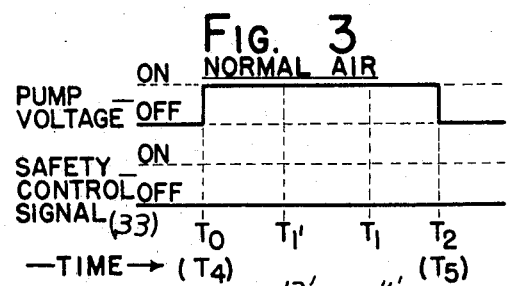
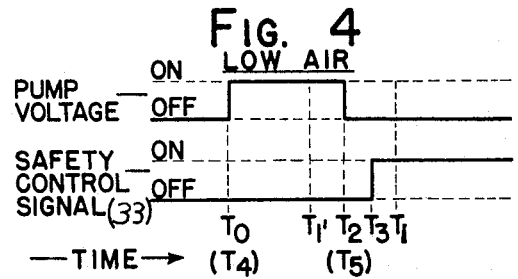
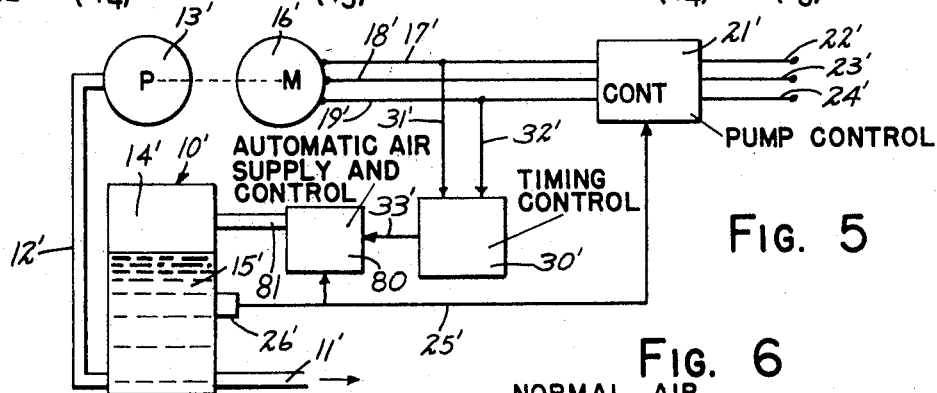
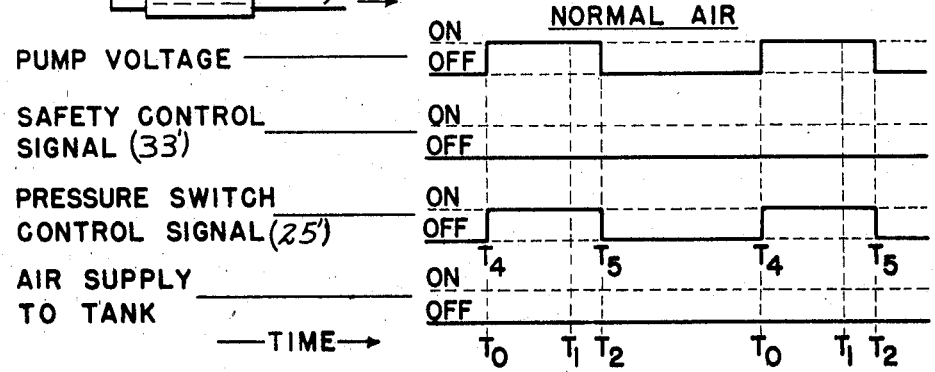
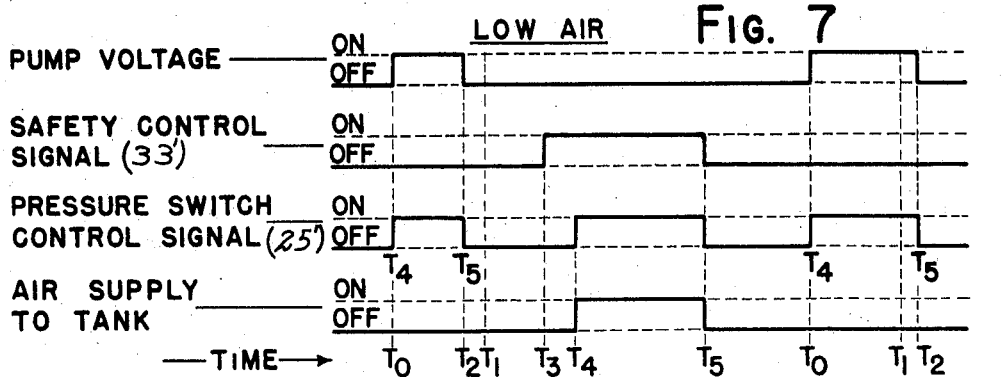
INVENTOR.
FREDERICK I. MOYER
BY
Merchant & Gould
ATTORNEYS

United States Patent Office 3,473,549
Patented Oct. 21, 1969

3,473,549
SAFETY CONTROL APPARATUS
Frederick I. Moyer, 5349 Kellogg Ave.,
Minneapolis, Minn. 55424
Filed May 16, 1967, Ser. No. 638,927
Int. Cl. F04f 1/18; B67d 5/54; F04d 15/00
U.S. Cl. 137—209                         9 Claims

ABSTRACT OF THE DISCLOSURE

Safety control apparatus for a reservoir having a pump operated by an electric motor including a relay attached to the motor so as to operate when the motor is energized and deenergized. The relay has a set of normally open contacts and a set of normally closed contacts which are connected in circuit with a timing relay, first and second locking relays, and their contacts. The circuit compares the period of time which the motor is energized to the time required for the timing relay to operate after it is energized. If the motor is deenergized before the timing relay operates, the second locking relay completes a circuit to an indicator which remains energized until manually deactivated. This indicates that the on-off cycle of the motor is too short and, thus, the volume of air in the reservoir tank is too low.

BACKGROUND OF THE INVENTION

Field of the invention

In many liquid pumps, such as water pumps and the like, wherein it is desired to maintain a relatively constant pressure in a supply line, it is generally common to provide a reservoir into which the pump initially forces the liquid. The reservoir is generally in the form of a hollow tank and contains a relatively large quantity of air. As the liquid is forced into the reservoir, the air is compressed and produces a pressure on the liquid in the supply lines, which pressure greatly increases the period of time of an on-off cycle of the pump. That is, the pump remains on for a longer period of time and then remains off for a longer period of time because of the air pressure within the reservoir. However, the air within the reservoir gradually mixes with the liquid so that eventually the reservoir fills completely with liquid. At this time, because the liquid is incompressible, high pressure surges result, subjecting the pump assembly and motor to permanent damage.

Description of the prior art

Some devices have been devised to alleviate this problem, which devices in general operate by measuring the upper limit of the liquid in the reservoir. Devices of this type are extremely unsatisfactory because they require a modification of the reservoir and because they are extremely difficult to install in a completely enclosed reservoir. Also, because devices of this type are mounted with the reservoir, they are extremely difficult to examine and determine if they are operating properly.

SUMMARY OF THE INVENTION

This invention pertains to safety control apparatus for liquid reservoirs having a liquid pump powered by a motor operatively attached thereto, and more specifically to safety control apparatus wherein at least a portion of the on-off cycle of the motor is compared to a predetermined time. When the motor is operating for a period of time less than a specified period, the present invention provides a signal which may be utilized to energize an indicator, deenergize the motor, and/or energize an air supply unit which forces air into the reservoir to increase the time period which the motor is on.

It is an object of the present invention to provide a new and improved safety control apparatus for liquid reservoirs having a liquid pump powered by a motor operatively attached thereto.

It is a further object of the present invention to provide a safety control apparatus that automatically provides a signal before the time period of the pump and motor becomes dangerously low, which signal may be utilized to control the motor, an air supply to the reservoir, and/or an indicator.

It is a further object of the present invention to provide a safety control apparatus which is simple to install in either a new reservoir system or one already in operation.

It is a further object of the present invention to provide safety control apparatus which is inexpensive to manufacture and maintain.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIGURE 1 is a block diagram of a liquid reservoir and pump system having the present safety control apparatus attached thereto in one embodiment;

FIGURE 2 is a schematic diagram of the safety control circuitry illustrated in FIGURE 1;

FIGURE 3 is a voltage-time chart of the apparatus illustrated in FIGURE 1 when the reservoir contains a normal amount of air;

FIGURE 4 is a voltage-time chart similar to that illustrated in FIGURE 3 when the reservoir contains a low amount of air;

FIGURE 5 is a block diagram similar to FIGURE 1 illustrating a different connection of the safety control apparatus;

FIGURE 6 is a voltage-time chart of the safety control apparatus illustrated in FIGURE 5 when the amount of air in the reservoir is normal; and FIGURE 7 is a voltage-time chart similar to that illustrated in FIGURE 6 when the amount of air in the reservoir is low.

DESCRIPTION OF THE PREFERRED EMBODIMENT

In the figures, the numeral 10 generally designates a reservoir having an outlet supply line 11 attached thereto, and an inlet supply line 12 operatively connected between a pump 13 and the reservoir 10. The reservoir 10 is illustrated with a supply of air 14 therein situated above a liquid 15. A three-phase electric motor 16 is mechanically attached to the pump 13 in the usual manner. It should be understood that the type of motor utilized as motor 16 is not important here, and a three-phase motor was shown simply because it is a common type. The motor 16 is connected by three leads 17, 18, and 19 to a power control circuit 20. Three leads, which for convenience will be considered the same as the leads 17, 18, and 19, are connected between the power control circuit 20 and a pump control circuit 21. The pump control circuit 21 is a standard circuit connected to a three-phase source of power by leads 22 to 24. The pump control circuit 21 is attached by a lead 25 to a pressure switch 26, mounted in the reservoir 10 to sense the pressure of the liquid 15 therein. The reservoir 10, pump 13, motor 16, pump control 21, and pressure switch 26 are connected in the usual embodiment for water pumps and the like. Because each of these components and their connection is old and well known in the art, no specific embodiment thereof is illustrated.

A timing control circuit generally designated 30, is connected to lead 17 of the motor 16 by a lead 31, and to lead 19 of the motor 16 by lead 32. The timing control circuit 30 has an output lead 33 having an output signal thereon hereinafter also referred to as a safety control signal, which is connected to the power control circuit 20 and to an indicator 34. As will be illustrated in conjunction with FIGURE 5, the output lead 33 of the timing control circuit 30 may be connected in a variety of embodiments. Also, the power control circuit 20 can be connected between the motor 16 and the connection of the leads 31 and 32 to the leads 17 and 19, between the power source and the pump control 21 in a manner to interrupt the leads 22–24, or in a manner to interrupt the lead 25. It should be understood that other positions for the power control circuit 20 might be found by those skilled in the art, and each of these is fully intended to be within the scope of this invention.

Referring to FIGURE 2, the timing control circuit 30, the power control circuit 20, and the indicator 34 are illustrated schematically to show one embodiment of the connection therefor. A sensing relay 40 is connected to the lead 17 by the lead 31, and to the lead 19 by the lead 32. The sensing relay 40 has a set of normally open contacts 40a and a set of normally closed contacts 40b. A timing relay 41 has a set of normally closed contacts 41a. One side of the coil for the timing relay 41 is connected to a common lead 42, and the other side is connected to a contact 43 of a double-pole double-throw switch generally designated 44. Another contact 45 of the switch 44 is connected to one lead of a coil for a second timing relay 46. The other lead of the coil for the second timing relay 46 is connected to the common lead 42. The second timing relay 46 has a set of normally closed contacts 46a. A first locking relay 50 has two sets of normally open contacts 50a and 50b. One contact of the set of contacts 50a is connected to an arm 51 of the switch 44, while the other contact of the set of contacts 50a is connected to one side of the coil of the first locking relay 50, one contact of the set of contacts 40b, one contact of the set of contacts 40a and one contact of the set of contacts 50b. The other side of the coil for the first locking relay 50 is connected to the common lead 42. The other contact of the set of contacts 40b is connected to one output terminal 55, one side of a coil for a power relay 56, one side of a coil for a second locking relay 57, one side of an indicator light 58, one side of an indicator buzzer 59, and one contact of a set of normally open contacts 57a associated with the second locking relay 57. A second output terminal 60, the opposite side of the coil for the power relay 56, the opposite side of the coil for the second locking relay 57, the opposite side of the indicator light 58, and the opposite side of the indicator buzzer 59 are all connected to the common lead 42. The other contact of the set of contacts 57a is connected to one contact of a normally closed push button switch 65, the other contact of the set of contacts 40a and a second arm 66 of the double-pole double-throw switch 44. The other contact of the set of contacts 50b is connected to one contact of the set of contacts 41a, and to one contact of the set of contacts 46a. The other contact of the set of contacts 41a is connected to a contact 67 associated with the arm 66 of the switch 44, and the other contact of the set of contacts 46a is connected to a second contact 68 associated with the arm 66 of the switch 44. A second contact of the push button switch 65 is connected to a terminal 70 and the common lead 42 is connected to a second terminal 71. The terminals 70 and 71 are adapted to be attached to a suitable source of power.

In the operation of the apparatus as illustrated schematically in FIGURE 2, when the motor 16 is energized by the three-phase power passing through the pump control 21 on the leads 17, 18, and 19, the sensing relay 40 is energized. Energizing the sensing relay 40 causes the normally open set of contacts 40a to close and the normally closed set of contacts 40b to open. When the set of contacts 40a closes, a circuit is completed from the terminal 70 to the push button switch 65, the set of contacts 40a, the first locking relay 50, and the common lead 42 to the terminal 71. Completing the circuit through the coil of the first locking relay 50 energizes the relay and causes the two sets of contacts 50a and 50b to close. The double-pole double-throw switch 44 is normally maintained so that the arm 51 is engaged with the contact 43 and the arm 66 is engaged with the contact 67. When the two sets of contacts 50a and 50b close, a circuit is completed from the terminal 70, through the push button switch 65, the arm 66 and contact 67 of the switch 44, contact 41a, contact 50b, contact 50a, the arm 51 and contact 43 of the switch 44, the coil of the timing relay 41, and the common lead 42 to the terminal 71. Completing this circuit energizes the timing relay 41 and starts the timer operating. At some predetermined time $T_1$ after the timing relay 41 is energized, the normally closed set of contacts 41a open. As long as the motor 16 is still energized, the sensing relay 40 is still energized and the set of contacts 40b are open while the set of contacts 40a are closed. Therefore, the operation of the timer in the timing relay 41 to open the set of contacts 41a has no effect on the circuit. Once the motor is deenergized, the sensing relay 40 is deenergized and the set of contacts 40a open to break the circuit deenergizing the first locking relay 50. The timing relay 41 is then no longer energized and returns to its original reset condition.

If the motor 16 and the sensing relay 40 are deenergized before the timing relay 41 operates, the contacts 40b close, and a circuit is completed from the terminal 70, through the push button switch 65, the arm 66 and contact 67 of the switch 44, the contacts 41a, the contact 50b, the contacts 40b, the coil of the power relay 56 and the common lead 42 to the terminal 71. The power relay 56 has two sets of normally closed contacts 56a and 56b, which are connected in the leads 17 and 19, respectively, and open to deenergize the motor 16 when power relay 56 is energized. Once the coil of the power relay 56 is energized, a signal also appears between the output terminals 55 and 60 and the coil of the second locking relay 57, the indicator light 58 and the indicator buzzer 59 are energized. Energizing the coil of the second locking relay 57 closes the contact 57a which completes a circuit from the terminal 70 through the push button switch 65, the contacts 57a, the coil of the second locking relay 57, and the common lead 42 to the terminal 71. Thus, the power relay 56, the second locking relay 57, the indicator light 58, and the indicator buzzer 59 remain energized and a signal is prevalent between the output terminals 55 and 60 until the push button 65 is depressed to break the circuit.

The time required for the timing relay 41 to operate is generally set at some period of time substantially smaller than the period of time the motor 16 operates during a normal on-off cycle. Thus, as long as there is sufficient air 14 in the reservoir 10 so that the pump 13 and motor 16 are operating normally, the timing control circuit 30 has no effect on the motor 16. This is clearly indicated in the voltage-time chart of FIGURE 3 where it can be seen that no safety control signal, the signal prevalent between the terminals 55 and 60 when the power relay 56 is energized, is apparent when the pump voltage is on for a period $T_2$ longer than the period $T_1$ required for the timing relay 41 to operate. As can be seen in FIGURE 4, when the pump voltage is on for a shorter period of time, $T_2$, than the time $T_1$ required for the timing relay 41 to operate, a safety control signal is apparent on the output terminals 55 and 60 at some time $T_3$. The time $T_3$ may vary slightly according to the reaction time of the various relays and their contacts and might typically appear at substantially time $T_2$, but is indicated at a slightly later time in FIGURE 4 to illustrate a slight delay in the operation of the various relays.

Assuming that the time $T_1$ required for the timing relay 41 to operate is ample time for the on portion of the cycle of the motor 16 so that no damage will occur to the pump 13 or the motor 16 even though it operates for a shorter period of time during each cycle, the second timing relay 46 is provided in the circuit. The second timing relay 46 requires a period of time $T_1'$ to operate, which period is much shorter than the period of time $T_1$. Thus, the first timing relay 41 operates as an indication that the air 14 in the reservoir 10 is becoming low. Once the on-off cycle of the motor 16 becomes short enough to energize the power relay 56 and remove power from the motor 16, the double-pole double-throw switch 44 should be moved so that the arm 51 engages the contact 45 and the arm 66 engages the contact 68. This connects the second timing relay 46 into the circuit and the entire pumping circuit will again operate until the air 14 in the reservoir 10 becomes low enough to reduce the on-off cycle of the motor 16 sufficiently to cause the power relay 56 to be energized again. If the timing relay 41 is replaced with an adjustable timing relay, the second timing relay 46 and the double-pole double-throw switch 44 may be eliminated. The timing relay 41 may then be set to operate at some time $T_1$, and as the air 14 in the reservoir 10 recedes the timing relay can be readjusted to the time $T_1'$. In either case, the second setting, $T_1'$, should be used only to give the operator sufficient time to recharge the reservoir 10 with a normal amount of air.

In the second embodiment illustrated in FIGURE 5, all of the circuitry is the same except that the power relay 56, the indicator light 58, and the indicator buzzer 59 are not used. The output signal across the terminals 55 and 60 of the circuit illustrated in FIGURE 2 is applied to an automatic air supply and control apparatus designated 80 in FIGURE 5. In the remainder of the circuitry, components which are similar to those in FIGURE 1 are designated with a similar number having a prime added to indicate that it is another embodiment. The automatic air supply and control apparatus 80 in some device such as a pump to provide air under pressure, and the output thereof is connected by a duct 81 to the upper portion of the reservoir 10'. The automatic air supply and control apparatus 80 is also connected to the pressure switch 26' so that it supplies air under pressure to the reservoir 10' only when the pressure therein is low, as indicated by a pressure switch control signal from the pressure switch 26' and only when the air therein is low, as indicated by the timing control 30'. Thus, when the pressure and the amount of air in the reservoir 10' is low, the automatic air supply control apparatus 80 turns on and when sufficient air has been pumped into the reservoir 10' to raise the pressure, a signal is supplied by the pressure switch 26' to the automatic air supply and control apparatus 80 which turns it off. As can be seen in the voltage-time chart illustrated in FIGURES 6 and 7, the operation of this embodiment is continuous.

Thus, a safety control apparatus for liquid reservoir tanks having a liquid pump powered by a motor operatively attached thereto has been described. This safety control apparatus is inexpensive and can be installed in any reservoir and pumping system, whether new or already in use. The described safety control apparatus is also easy to operate, and can be installed completely automatic or, somewhat less expensively, to provide the operator with sufficient time to recharge the reservoir with air before it becomes so low that damage is likely to result.

While I have shown and described specific embodiments of this invention, further modifications and improvements will occur to those skilled in the art.

I claim:

1. Safety control apparatus for liquid reservoir tanks having a liquid pump powered by a motor operatively attached thereto comprising:
    (a) means responsive to on-off cycles of the motor;
    (b) timing means providing an indication of the passage of a preselected period of time; and
    (c) circuitry connected to said responsive means and said timing means for intermittently comparing the energized portion of the time period of an on-off cycle of the motor to the preselected period of time and providing an output signal whenever the portion of the time of an on-off cycle is less than the preselected period of time,
    (d) control means attached to the circuitry for receiving the output signal therefrom and adjusting the system to prevent damage thereto.

2. Safety control apparatus as set forth in claim 1 wherein the responsive means includes a relay connected in the energization circuit of the motor so as to react at the time when the motor is energized and deenergized.

3. Safety control apparatus as set forth in claim 1 wherein the timing means includes a timing relay which operates a predetermined time after the relay is activated.

4. Safety control apparatus as set forth in claim 1 having in addition indicating means attached to the circuitry for receiving the output signal therefrom and providing an indication when the motor is energized for a period of time less than the preselected period of time.

5. Safety control apparatus as set forth in claim 1 wherein the control means includes means attached to the circuitry for receiving the output signal therefrom and interrupting the operation of the motor when said motor is energized for a period of time less than the preselected period of time.

6. Safety control apparatus as set forth in claim 1 wherein the control means includes means controllable to supply pressurized air to the liquid reservoir tank, said controllable means being connected to receive the output signal from the circuitry and providing pressurized air to said reservoir tank when the motor is energized for a period of time less than the preselected period of time.

7. Safety control apparatus for liquid reservoir tanks having a liquid pump powered by an electric motor operatively attached thereto comprising:
    (a) a sensing relay connected in the energization circuit of the electric motor, said sensing relay having a set of normally open contacts and a set of normally closed contacts associated therewith which two sets of contacts operate at the times when the motor is energized and deenergized;
    (b) a timing relay having a set of normally closed contacts, said timing relay operating to open said set of contacts a preselected period of time after said timing relay is energized;
    (c) a first locking relay having first and second sets of normally open contacts;
    (d) a second locking relay having a set of normally open contacts;
    (e) said timing relay being connected in series with said first set of contacts of said first locking relay, said normally closed set of contacts of said sensing relay and said set of normally open contacts of said second locking relay between a pair of terminals adapted to be connected to a suitable source of power;
    (f) said first locking relay being connected in parallel with the series connection of said timing relay and said first set of contacts of said first locking relay;
    (g) said second locking relay being connected in parallel with the series connection of said timing relay, said first set of contacts of said first locking relay and said normally closed set of contacts of said sensing relay; and
    (h) a series connection of said second set of contacts of said first locking relay and said set of contacts of said timing relay being connected in parallel with said normally open set of contacts of said sensing relay and the series connection of said normally closed set of contacts of said sensing relay with said set of contacts of said second locking relay.

8. Safety control apparatus as set forth in claim 7 having in addition circuit interrupting means connected in series with the second locking relay and the set of contacts thereof.

9. Safety control apparatus as set forth in claim 7 having in addition a power relay connected in parallel with the second locking relay, said power relay having normally closed contacts connected in the energization circuit of the motor and interrupting the energization thereof upon energization of said power relay.

References Cited

UNITED STATES PATENTS

| | | | |
|---|---|---|---|
| 2,672,818 | 3/1954 | Adams | 103—25 |
| 3,148,622 | 9/1964 | Le Van | 103—25 |
| 3,166,318 | 1/1965 | Barger | 318—486 XR |
| 3,342,136 | 9/1967 | Domecki. | |

ROBERT G. NILSON, Primary Examiner

U.S. Cl. X.R.

103—25; 318—484